United States Patent
Kato et al.

(10) Patent No.: US 9,929,403 B2
(45) Date of Patent: Mar. 27, 2018

(54) METHOD OF PRODUCING AN ACTIVE MATERIAL POWDER

(71) Applicant: TOYOTA JIDOSHA KABUSHIKI KAISHA, Toyota-shi, Aichi-ken (JP)

(72) Inventors: Yuki Kato, Gotenba (JP); Takamasa Ohtomo, Susono (JP); Hisatsugu Yamasaki, Gotenba (JP); Masatsugu Kawakami, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 437 days.

(21) Appl. No.: 14/640,772

(22) Filed: Mar. 6, 2015

(65) Prior Publication Data
US 2015/0270537 A1    Sep. 24, 2015

(30) Foreign Application Priority Data
Mar. 19, 2014  (JP) .................. 2014-056474

(51) Int. Cl.
*H01M 4/13*    (2010.01)
*H01M 4/36*    (2006.01)
(Continued)

(52) U.S. Cl.
CPC ............ *H01M 4/366* (2013.01); *C01G 33/00* (2013.01); *C01G 45/1242* (2013.01);
(Continued)

(58) Field of Classification Search
CPC ........ H01M 4/366; H01M 4/485; H01M 4/62; H01M 4/505; H01M 10/0525; H01M 10/0562; H01M 10/0585; C01G 33/00; C01G 45/1242; C01P 2006/12; C01P 2002/88; C01P 2004/84
(Continued)

(56) References Cited

U.S. PATENT DOCUMENTS

2009/0081554 A1    3/2009  Takada et al.
2015/0311507 A1   10/2015  Miki et al.

FOREIGN PATENT DOCUMENTS

JP    2010-073539 A    4/2010
JP    2012-170927 A    9/2012
(Continued)

OTHER PUBLICATIONS

Ohta, Narumi et al., "LiNbO3-Coated LiCoO2 as Cathode Material for All Solid-State Lithium Secondary Batteries," Electrochemistry Communications, 2007, vol. 9, pp. 1486-1490.
(Continued)

*Primary Examiner* — Gary Harris
(74) *Attorney, Agent, or Firm* — Oliff PLC

(57) ABSTRACT

A method of producing an active material powder includes (i) an attachment step of obtaining a powder including an active material particle, which stores and releases lithium ions at a potential of 4.5 V or higher based on Li, and a coating layer precursor, which is attached to a surface of the active material particle, by attaching an alkoxide solution containing lithium ions and niobium ions to the surface of the active material particle and drying the attached alkoxide solution; and (ii) a heating step of forming a coating layer on the surface of the active material particle by heating the powder obtained in the attachment step to be within a temperature range of 120° C. to 200° C.

4 Claims, 7 Drawing Sheets

(51) Int. Cl.
*H01M 4/485* (2010.01)
*C01G 33/00* (2006.01)
*C01G 45/12* (2006.01)
*H01M 4/62* (2006.01)
H01M 4/505 (2010.01)
H01M 10/0525 (2010.01)
H01M 10/0562 (2010.01)
H01M 10/0585 (2010.01)

(52) U.S. Cl.
CPC ............. *H01M 4/485* (2013.01); *H01M 4/62* (2013.01); *C01P 2002/88* (2013.01); *C01P 2004/84* (2013.01); *C01P 2006/12* (2013.01); *H01M 4/505* (2013.01); *H01M 10/0525* (2013.01); *H01M 10/0562* (2013.01); *H01M 10/0585* (2013.01)

(58) Field of Classification Search
USPC ..................................................... 429/231.1
See application file for complete search history.

(56) References Cited

FOREIGN PATENT DOCUMENTS

| | | |
|---|---|---|
| JP | 2014-011028 A | 1/2014 |
| WO | 2007/004590 A1 | 1/2007 |

OTHER PUBLICATIONS

Takada, Kazunori, et al., "Interfacial Phenomena in Solid-State Lithium Battery with Sulfide Solid Electrolyte," Solid State Ionics, 2012, vol. 225, pp. 594-597.

METHOD OF PRODUCING AN ACTIVE MATERIAL POWDER

INCORPORATION BY REFERENCE

The disclosure of Japanese Patent Application No. 2014-056474 filed on Mar. 19, 2014 including the specification, drawings and abstract is incorporated herein by reference in its entirety.

BACKGROUND OF THE INVENTION

1. Field of the Invention

The present invention relates to active material powder including an active material and lithium niobate attached to at least part of a surface of the active material, and a method of producing the same.

2. Description of Related Art

A metal ion secondary battery (for example, a lithium ion secondary battery; hereinafter also referred to as "all-solid-state battery") including a solid electrolyte layer in which a flame-retardant solid electrolyte is used has advantageous effects in that, for example, a system for securing safety can be easily simplified.

As a technique regarding such an all-solid-state battery, for example, International Publication WO 2007/004590 discloses a technique of forming a $LiNbO_3$ coating layer on a surface of a $LiCoO_2$ powder particle through a step of hydrolyzing an alkoxide solution containing lithium and niobium on the surface of the $LiCoO_2$ powder particle. In addition, International Publication WO 2007/004590 also discloses a technique of spraying the alkoxide solution on the surface of the $LiCoO_2$ powder particle, hydrolyzing the alkoxide solution at an atmospheric humidity to form a coating layer, and then heating the coating layer at 400° C. for 30 minutes to obtain $LiCoO_2$ powder having a surface coated with $LiNbO_3$.

In the technique disclosed in International Publication WO 2007/004590, a $LiNbO_3$ coating layer is formed on a surface of a positive electrode active material. Therefore, for example, when this positive electrode active material is used in combination with a sulfide-based solid electrolyte, a lithium ion conductive oxide layer can be allowed to be present at an interface between the positive electrode active material and the sulfide-based solid electrolyte. As a result, output characteristics of the all-solid-state battery can be expected to be improved. However, in a lithium ion secondary battery obtained using the technique disclosed in International Publication WO 2007/004590, an active material powder in which a $LiNbO_3$ layer is foamed on a surface of an active material is used, and the active material (hereinafter, also referred to as "high-potential active material") stores and releases lithium ions at a potential of 4.5 V or higher when a $Li^+/Li$ equilibrium potential is 0 V. In this lithium ion secondary battery, there is a problem in that a resistance after being repeatedly charged and discharged is likely to increase. That is, when the $LiNbO_3$ layer is formed on the surface of the high-potential active material using the technique disclosed in International Publication WO 2007/004590, charging-discharging cycle characteristics are likely to decrease.

SUMMARY OF THE INVENTION

The invention has been made to provide an active material powder capable of improving charging-discharging cycle characteristics, and a method of producing the same.

In order to form a $LiNbO_3$ layer on a surface of a high-potential active material, the present inventors attached an alkoxide solution containing lithium ions and niobium ions to a surface of a high-potential active material using, for example, a tumbling fluidized bed granulating-coating machine, dried the attached alkoxide solution, and heated the alkoxide solution in a predetermined temperature range. Through the above-described steps, an active material powder is prepared. The present inventors investigated charging-discharging cycle characteristics of a lithium ion secondary battery in which the above active material powder is used. It was found from the result that the charging-discharging cycle characteristics of this lithium ion secondary battery can be improved as compared to the lithium ion secondary battery in which the active material powder which is prepared using the technique disclosed in International Publication WO 2007/004590 is used. In addition, it was also found that, regarding the active material powder prepared through the above steps, when a weight loss of the active material powder per unit volume which is obtained by Thermogravimetry-Differential Thermal Analysis (hereinafter, referred to as "TG-DTA") after being heated from 200° C. to 350° C. (weight loss per unit volume which is specified using a difference between the weight of the active material powder at 200° C. and the weight of the active material powder at 350° C.) is represented by W ($g/mm^3$), when a BET specific surface area of the high-potential active material before the formation of the $LiNbO_3$ layer is represented by S ($m^2/g$), and when a target thickness during the formation of the $LiNbO_3$ layer on the surface of the high-potential active material is represented by h (nm), a weight loss ratio X (ppm)=W×S×h calculated using the above factors is a predetermined value or higher. The invention has been completed based on the above findings.

According to a first aspect of the invention, there is provided a method of producing an active material powder including: an attachment step of obtaining a powder including an active material particle and a coating layer precursor, which is attached to a surface of the active material particle, by attaching an alkoxide solution containing lithium ions and niobium ions to the surface of the active material particle and drying the alkoxide solution attached to the surface of the active material particle; and a heating step of forming a coating layer on the surface of the active material particle by heating the powder obtained in the attachment step, in which the active material particle stores and releases lithium ions at a potential of 4.5 V or higher based on Li, and in the heating step, the powder is heated to be within a temperature range of 120° C. to 200° C.

The alkoxide solution attached to the surface of the active material particle may be dried while the alkoxide solution is attached to the surface of the active material particle.

Here, according to the invention, in the attachment step, the coating layer precursor which forms the coating layer is attached to the surface of the active material particle by heating the powder in the heating step. In the attachment step, the coating layer precursor which forms the $LiNbO_3$ layer in the subsequent step is attached to the surface of the active material particle by spraying and drying the alkoxide solution containing lithium ions and niobium ions on the surface of the active material particle using, for example, a tumbling fluidized bed granulating-coating machine. In addition, according to the invention, "storing and releasing lithium ions at a potential of 4.5 V or higher based on Li" represents storing and releasing lithium ions at a potential of 4.5 V or higher when a $Li^+/Li$ equilibrium potential is 0 V. By controlling the temperature of the heating step to be within a range of 120° C. to 200° C., the coating layer containing a hydroxide can be formed on the surface of the active material particle. In a lithium ion secondary battery which is obtained by using the high-potential active material having a surface, on which the coating layer containing a hydroxide is formed, in a positive electrode layer, the resistance thereof after being repeatedly charged and discharged can be reduced as compared to the related art. Accordingly, with such a configuration, the method of producing an active material powder capable of improving charging-discharging cycle characteristics can be provided.

According to a second aspect of the invention, there is provided an active material powder including: an active material particle that stores and releases lithium ions at a potential of 4.5 V or higher based on Li; and a coating layer containing $LiNbO_3$ that is attached to a surface of the active material particle, in which when a weight loss per unit volume, which is specified using a difference between a weight of the active material powder after being heated in air from 200° C. to 350° C. and a weight of the active material powder before being heated in air from 200° C. to 350° C., is represented by W ($g/mm^3$), when a BET specific surface area of the active material particle is represented by S ($m^2/g$), and when a target thickness during formation of the coating layer is represented by h (nm), a weight loss ratio X (ppm)=W×S×h satisfies an expression of X≥126.1.

Here, "weight loss W ($g/mm^3$) per unit volume" refers to the weight loss of the active material powder per unit volume which is obtained by TG-DTA after being heated in air from 200° C. to 350° C. More specifically, "weight loss W ($g/mm^3$) per unit volume" refers to the weight loss per unit volume which is specified using a difference between the weight of the active material powder at 200° C. and the weight of the active material powder at 350° C. In addition, "BET specific surface area ($m^2/g$) of the active material particle" refers to the BET specific surface area ($m^2/g$) of the active material powder before the coating layer is formed on the surface of the active material particle. In the active material powder which satisfies X≥126.1, the coating layer contains a hydroxide. Therefore, the weight loss ratio X is high due to the heating in air from 200° C. to 350° C. in a lithium ion secondary battery which is obtained by using the high-potential solid electrolyte, in which the coating layer contains a hydroxide, in a positive electrode layer, the resistance thereof after being repeatedly charged and discharged can be reduced as compared to the related art. Accordingly, with such a configuration, an active material powder capable of improving charging-discharging cycle characteristics can be provided.

An active material powder capable of improving charging-discharging cycle characteristics, and a method of producing the same can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A case is assumed where an active material powder including a high-potential active material particle and a coating layer which contains $LiNbO_3$ attached to a surface of the high-potential active material particle (hereinafter, also referred to simply as "coating layer") is prepared through a heat treatment step. In this case, for example, when the heat treatment step is performed at a temperature (for example, 400° C.) of a case where the active material particle is $LiCoO_2$, charging-discharging cycle characteristics of a battery prepared using the obtained active material powder are likely to decrease. The reason is considered to be that $LiCoO_2$ and the high-potential active material have different mechanisms of reducing the resistance of the battery by the coating layer. The details of a difference between the mechanisms is not still clear. However, the following is considered: when the coating layer is formed using the related technique in which $LiCoO_2$ is used as the active material particle, even if a hydroxide of the coating layer is decomposed into an oxide of $LiNbO_3$ by firing, a high-resistance layer is not formed; on the other hand, when the coating layer is formed on the high-potential active material particle, a high-resistance layer is formed along with the decomposition of the hydroxide. As a result of thorough investigation based on the above consideration, the present inventors found that the coating layer formed on the surface of the high-potential active material particle can be maintained as a hydroxide by setting the heat treatment temperature for preparing the active material powder to be within a temperature range of 120° C. to 200° C. such that a hydroxide is not decomposed. As a result, charging-discharging cycle characteristics of a battery in which the obtained active material powder is used can be improved. In addition, it was found that, in the active material powder prepared through the above-described steps, the hydroxide remains on the coating layer, and thus a weight loss ratio X of the active material powder after being heated in air from 200° C. to 350° C. (a temperature at which the hydroxide is considered to be decomposed) is higher than that of the active material powder of the related art. The invention has been completed based on these findings.

Hereinafter, an embodiment of the invention will be described with reference to the drawings. The invention is not limited to the following embodiment.

1. Method of Producing Active Material Powder

Figure 1:
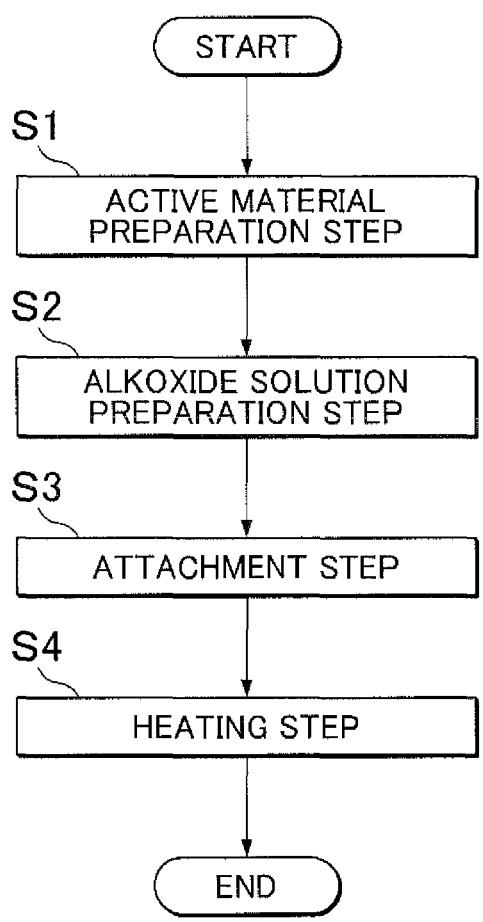
FIG. 1 is a diagram illustrating a method of producing an active material powder.

FIG. 1 is a diagram illustrating a method of producing an active material powder according to the embodiment of the invention. The method illustrated in FIG. 1 includes an active material preparation step (S1), an alkoxide solution preparation step (S2), an attachment step (S3), and a heating step (S4).

In the active material preparation step (hereinafter, also referred to as "S1"), an active material particle having a surface to which an alkoxide solution is attached in the attachment step described below is prepared, in which the active material particle (hereinafter, also referred to as "high-potential active material particle) can store and release lithium ions at a potential of 4.5 V or higher based on Li. The configuration of S1 is not particularly limited as long as the high-potential active material particle can be prepared in this step. In S1, the high-potential active material particle may be produced or purchased for the preparation.

In the alkoxide solution preparation step (hereinafter, also referred to as "S2"), an alkoxide solution which is attached to the surface of the high-potential active material particle, prepared in S1, in the attachment step described below is prepared. S2 is not particularly limited as long as an alkoxide solution containing lithium ions and niobium ions can be prepared in this step. In S2, for example, after lithium ethoxide powder is dissolved in dehydrated ethanol, niobium pentaethoxide having a molar ratio (lithium:niobium) of 1:1 may be added to this solution under stirring.

In the attachment step (hereinafter, also referred to as "S3"), while the alkoxide solution prepared in S2 is sprayed on the high-potential active material particle prepared in S1, the alkoxide solution attached to the surface of the high-potential active material particle is dried. As a result, a powder in which a coating layer precursor is attached to the surface of the high-potential active material particle can be obtained. Due to the spraying in S3, the alkoxide solution is attached to the surface of the high-potential active material particle. Due to the drying in S3, volatile components such as a solvent, which are contained in the alkoxide solution attached to the surface of the high-potential active material particle, are removed. Hereinafter, a material which is attached to the surface of the high-potential active material particle after the drying in S3 will also be referred to as "coating layer precursor". While the alkoxide solution prepared in S2 is sprayed on the high-potential active material particle prepared in S1, the alkoxide solution attached to the surface of the high-potential active material particle may be not dried. The alkoxide solution attached to the surface of the active material particle may be dried after the completion of spaying the alkoxide solution to the surface of the active material particle.

In S3, for example, using a tumbling fluidized bed granulating-coating machine or a spray drier, the alkoxide solution attached to the surface of the high-potential active material particle can be dried. Examples of the tumbling fluidized bed granulating-coating machine include a Multiplex coater (manufactured by Powrex Corp.) and a flow coater (manufactured by Freund Corp.). When the tumbling fluidized bed granulating-coating machine is used in S3, and when one high-potential active material particle is focused, the alkoxide solution is dried immediately after the alkoxide solution is sprayed on the high-potential active material particle. Next, the spraying of the alkoxide solution on the high-potential active material particle and the drying of the alkoxide solution sprayed on the high-potential active material particle are repeated until a layer of the precursor (coating layer precursor) of lithium niobate attached to the surface of the high-potential active material particle has a target thickness. In addition, when the tumbling fluidized bed granulating-coating machine is used in S3, and when plural high-potential active material particles present in the machine are focused, high-potential active material particles on which the alkoxide solution is sprayed and high-potential active material particles on which the alkoxide solution is dried are present together. S3 may also be referred to as a step of obtaining a powder in which the coating layer precursor is attached to the surface of the high-potential active material particle.

In addition, in S3, the coating layer precursor is attached to the surface of the high-potential active material particle. As a result, even if the heating temperature in the heating step which is performed after S3 is reduced, lithium niobate can be formed on the surface of the high-potential active material particle. An effect obtained by reducing the heating temperature will be described below.

In the heating step (hereinafter, also referred to as "S4"), after S3, the powder in which the coating layer precursor is attached to the surface of the high-potential active material particle is heated in a temperature range of 120° C. to 200° C. In S4, an active material powder including the high-potential active material particle and a coating layer ($LiNbO_3$ layer), which is attached to the surface of the high-potential active material particle, can be obtained. The heat treatment of S4 can be performed in air.

In S4, the heating temperature is set to be 120° C. or higher. By heating the powder at this temperature, the amount of residual impurities (volatile components) such as a solvent of the alkoxide solution can be reduced. As a result, the reaction resistance of a battery in which the prepared active material powder is used can be reduced.

In addition, in S4, the heating temperature is set to be 200° C. or lower. Since S4 is performed after S3, the coating layer precursor is attached to the surface of the high-potential active material particle in S3. In S3, the coating layer precursor is attached to the surface of the high-potential active material particle. Therefore, even if the heating temperature is lower than that of the related art, a coating layer containing $LiNbO_3$ can be formed. When the heating temperature is high, a hydroxide contained in the coating layer precursor is likely to be decomposed, and in a battery which is manufactured using the active material powder in which a hydroxide does not remain, charging-discharging cycle characteristics are likely to decrease. The reason is considered to be that a high-resistance layer is formed because the coating layer reacts with the high-potential active material particle along with desorption of an OH group from the coating layer. Therefore, in the embodiment of the invention, from the viewpoint that the active material powder capable of improving charging-discharging cycle characteristics can be produced, the upper limit of the heating temperature of S4 is set as 200° C. at which a hydroxide contained in the coating layer precursor is not decomposed. Further, when the heating temperature is a predetermined value or higher, the coating layer containing crystallized $LiNbO_3$ is formed on the surface of the high-potential active material particle. The crystallized $LiNbO_3$ has lower lithium ion conductivity than amorphous $LiNbO_3$ and thus causes an increase in the reaction resistance of a battery. In order to reduce the reaction resistance of a battery, it is effective not to crystallize $LiNbO_3$. To that end, it is effective to set the heating temperature to be lower than a predetermined temperature. By reducing the heat treatment temperature to be 200° C. or lower, the crystallization of $LiNbO_3$ can be prevented, and thus charging-discharging cycle characteristics can be improved.

In this way, by heating the powder to be within a temperature range of 120° C. to 200° C. in S4 after S3, the coating layer is formed on the surface of the high-potential active material particle. Therefore, an active material powder capable of improving charging-discharging cycle characteristics of a battery can be produced.

In the method of producing an active material powder according to the embodiment of the invention, as a solvent used in S2, a well-known solvent which can be used for preparing the alkoxide solution containing lithium ions and niobium ions can be appropriately used. Examples of the solvent include dehydrated ethanol, dehydrated propanol, and dehydrated butanol.

In addition, in the method of producing an active material powder according to the embodiment of the invention, a molar ratio of lithium ions and niobium ions which are contained in the alkoxide solution prepared in S2 is not particularly limited. A molar ratio of lithium ions to niobium ions can be set to be, for example, 1:1.

In the above description regarding the method of producing an active material powder according to the embodiment of the invention, the alkoxide solution preparation step S2 is performed after the active material preparation step S1, but the invention is not limited to the embodiment. According to the invention, the alkoxide solution preparation step may be performed before the active material preparation step.

2. Method of Manufacturing Lithium Battery

Figure 2:
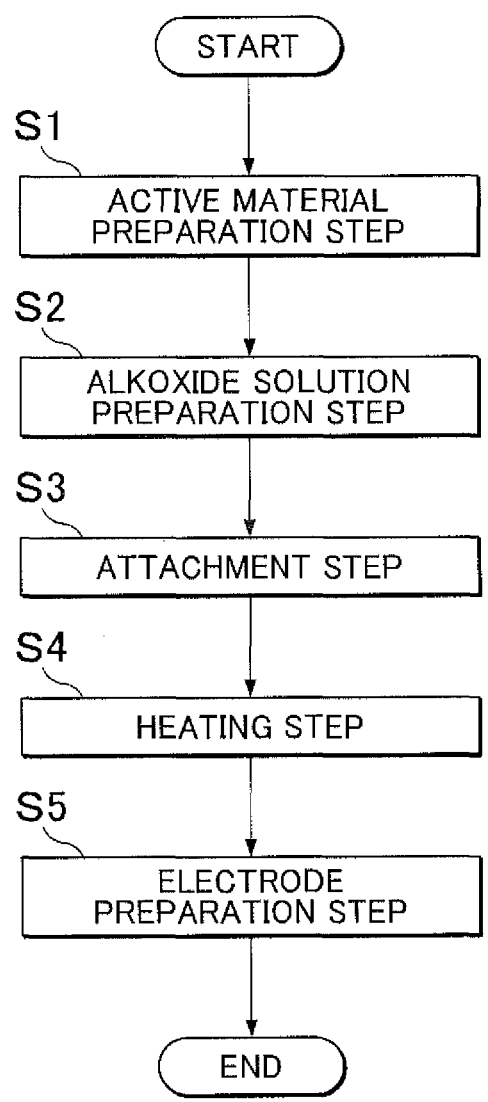
FIG. 2 is a diagram illustrating a method of manufacturing a lithium battery.

FIG. 2 is a diagram illustrating a method of manufacturing a lithium battery according to the embodiment of the invention. In FIG. 2, the same steps as the respective steps, which are described with reference to FIG. 1 illustrating the method of producing an active material powder according to the embodiment of the invention, are represented by the same reference numerals used in FIG. 1, and the description thereof will be appropriately omitted.

The method of manufacturing a lithium battery according to the embodiment of the invention illustrated in FIG. 2 includes the active material preparation step (S1), the alkoxide solution preparation step (S2), the attachment step (S3), the heating step (S4), and an electrode preparation step (S5). Since S1 to S4 have been described above in "1. Method of Producing Active Material Powder", the description thereof will be omitted.

Figure 4:
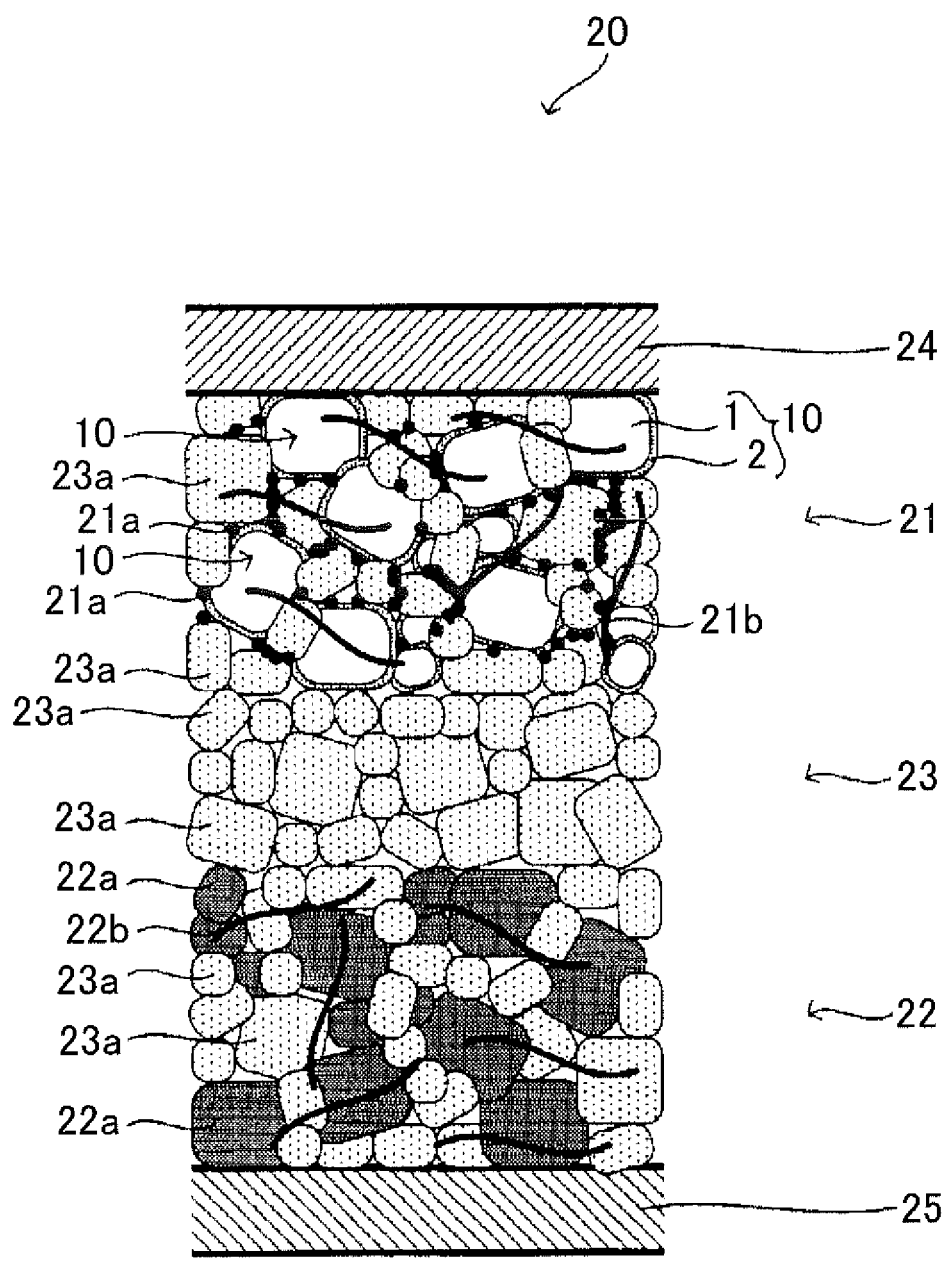
FIG. 4 is a diagram illustrating a lithium battery 20.

In the electrode preparation step (hereinafter, also referred to as "S5"), a positive electrode or a negative electrode including the active material powder which is produced through S1 to S4 is prepared. For example, when a lithium battery 20 illustrated in FIG. 4 is manufactured, a positive electrode 21 including an active material powder 10 is prepared in this step. S5 is not particularly limited as long as a positive electrode or a negative electrode including the active material powder according to the embodiment of the invention can be prepared in this step. For example, when the positive electrode 21 is prepared in S5, the active material powder 10, a sulfide solid electrolyte 23a, and a conductive additive 21a are mixed at a predetermined volume ratio, and this mixture is pressed at a predetermined pressure. Through these steps, the positive electrode 21 can be prepared.

In S5, once an electrode (a positive electrode or a negative electrode) including the active material powder according to the embodiment of the invention is prepared, another electrode (a positive electrode or a negative electrode) which interposes an electrolyte with the above electrode is prepared. Once a pair of electrodes (a positive electrode and a negative electrode) are prepared, an electrolyte is interposed between the positive electrode and the negative electrode. Through these steps, a lithium battery according to the embodiment of the invention can be manufactured.

3. Active Material Powder

Figure 3:
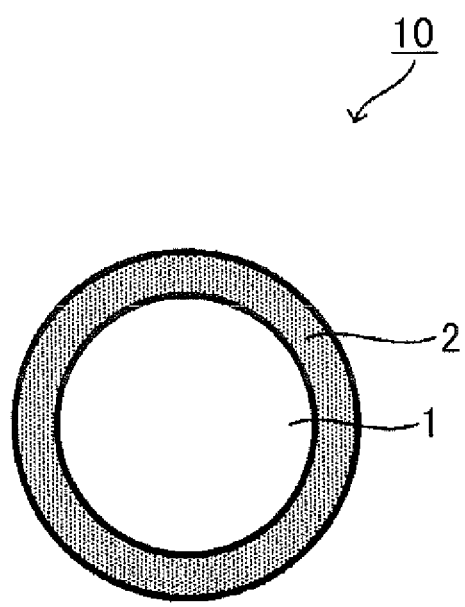
FIG. 3 is a diagram illustrating an active material powder 10.

FIG. 3 is a diagram illustrating the active material powder 10 according to the embodiment of the invention. For convenience of description, FIG. 3 illustrates a configuration in which a coating layer 2 containing $LiNbO_3$ is attached (coated) to a surface of one high-potential active material particle 1. However, the active material powder according to the invention is not limited to this embodiment. In the active material powder according to the invention, $LiNbO_3$ may be attached (coated) to a surface of a high-potential active material particle having a secondary particle form in which plural high-potential active material particles aggregate.

The active material powder 10 illustrated in FIG. 3 includes a high-potential active material particle 1 and a coating layer 2 containing $LiNbO_3$ which is attached to a surface of the high-potential active material particle 1. When a weight loss of the active material powder 10 per unit volume which is obtained by TG-DTA after being heated in air from 200° C. to 350° C. is represented by W (g/mm$^3$), when a BET specific surface area of the high-potential active material particle 1 before being coated with the coating layer 2 is represented by S (m$^2$/g), and when a target thickness during formation of the coating layer 2 is represented by h (nm), a weight loss ratio X (ppm) expressed by X=W×S×h satisfies an expression of X≥126.1.

The active material powder 10 can be produced using the method of producing an active material powder according to the embodiment of the invention including S1 to S4 described above. After S3, the powder in which the coating layer precursor is attached to the surface of the high-potential active material particle is heated to be within a temperature of 120° C. to 200° C. in S4. As a result, the coating layer 2 in which a hydroxide remains can be formed on the surface of the high-potential active material particle 1. In the active material powder 10, a hydroxide remains in the coating layer 2, and thus a weight loss ratio which is obtained after being heated in air from 200° C. to 350° C. is higher than that of an active material powder in which substantially no hydroxide remains in the coating layer 2. Specifically, this condition can be expressed by X≥126.1 ppm. By a hydroxide remaining in the coating layer 2, as described below, charging-discharging cycle characteristics of a battery in which the obtained active material powder 10 is used can be improved. Accordingly, according to the embodiment of the invention, the active material powder 10 capable of improving charging-discharging cycle characteristics of a battery can be provided.

According to the invention, the high-potential active material particle 1 is not particularly limited as long as it can store and release lithium ions at a potential of 4.5 V or higher based on Li. Examples of the material include $LiNi_{0.5}Mn_{1.5}O_4$ and $LiNi_{1/3}Co_{1/3}Mn_{1/3}O_2$. Even when any high-potential active material particle selected from the above examples is used, an active material powder including the coating layer 2 in which $LiNbO_3$ is contained and a hydroxide remains can be produced by using the method of producing an active material powder according to the embodiment of the invention including S1 to S4. It is considered that, by controlling the coating layer 2 to be in a state where a hydroxide remains therein, charging-discharging cycle characteristics can be improved. Therefore, the high-potential active material particle 1 to which the coating layer 2 is attached can be arbitrarily selected from the above-described exemplary materials.

In addition, the configuration of the coating layer 2 is not particularly limited as long as $LiNbO_3$ is contained and a hydroxide remains therein. However, in order to reduce the reaction resistance, it is preferable that the coating layer 2 be amorphous. The coating layer 2 having such a configuration can be formed, for example, through S3 and S4 of the above-described method of producing an active material powder according to the embodiment of the invention.

4. Lithium Battery

FIG. 4 is a diagram illustrating the lithium battery 20 (lithium ion secondary battery 20) according to the embodiment of the invention. In FIG. 4, the lithium battery 20 is simplified, and a battery case or the like is not illustrated.

As illustrated in FIG. 4, the lithium battery 20 includes a positive electrode 21, a negative electrode 22, a solid electrolyte layer 23 which is interposed between the electrodes, a positive electrode current collector 24 which is connected to the positive electrode 21, and a negative electrode current collector 25 which is connected to the negative electrode 22. The positive electrode 21 includes the active material powder 10 according to the embodiment of the invention, a sulfide solid electrolyte 23a, a conductive additive 21a, and a binder 21b. The active material powder 10 includes the high-potential active material particle 1 (hereinafter, also referred to as "positive electrode active material 1") and the coating layer 2 which is attached to the surface of the positive electrode active material 1. In addition, the negative electrode 22 includes a negative electrode active material 22a, the sulfide solid electrolyte 23a, and a binder 22b. In addition, the solid electrolyte layer 23 includes the sulfide solid electrolyte 23a. In the lithium battery 20, the positive electrode active material 1 is LiNi$_{0.5}$Mn$_{1.5}$O$_4$, and the negative electrode active material 22a is graphite.

In this way, the lithium battery 20 includes the positive electrode 21 containing the active material powder 10 according to the embodiment of the invention. As described above, the active material powder 10 can improve charging-discharging cycle characteristics. Accordingly, with the configuration in which the positive electrode 21 containing the active material powder 10 is provided, the lithium battery 20 capable of improving charging-discharging cycle characteristics can be provided.

Here, for example, the positive electrode 21 can be prepared as follows. The active material powder 10, the sulfide solid electrolyte 23a, the conductive additive 21a, and the binder 21b are poured into a solvent, and this solution is dispersed using an ultrasonic homogenizer or the like. As a result, a slurry-like positive electrode composition is prepared. A surface of the positive electrode current collector 24 is coated with this slurry-like positive electrode composition and then is dried.

In addition, for example, the negative electrode 22 can be prepared as follows. The negative electrode active material 22a, the sulfide solid electrolyte 23a, and the binder 22b are poured into a solvent, and this solution is dispersed using an ultrasonic homogenizer or the like. As a result, a slurry-like negative electrode composition is prepared. A surface of the negative electrode current collector 25 is coated with this slurry-like negative electrode composition and then is dried.

In addition, the solid electrolyte layer 23 can be formed, for example, through a step of pressing the sulfide solid electrolyte 23a. In this way, once the positive electrode 21, the negative electrode 22, and the solid electrolyte layer 23 are prepared, the negative electrode current collector 25, the negative electrode 22, the solid electrolyte layer 23, the positive electrode 21, and the positive electrode current collector 24 are laminated in an inert gas atmosphere (for example, an argon atmosphere, a nitrogen atmosphere, or a helium atmosphere) to form a laminate such that these elements are arranged in this order from one side to the other side as illustrated in FIG. 4. Next, for example, a step of pressing the laminate is performed, and thus the lithium battery 20 can be manufactured.

In the lithium battery according to the embodiment of the invention, the positive electrode active material can be appropriately selected from the materials described above as the specific examples of the high-potential active material particle 1 in "3. Active Material Powder". In addition, as the negative electrode active material, a material having a lower potential than that of the positive electrode active material can be used such that the lithium battery 20 having a target voltage can be configured when being combined with the positive electrode active material.

The positive electrode active material can have, for example, a particle shape or a thin film shape. An average particle size ($D_{50}$) of the positive electrode active material is, for example, preferably 1 nm to 100 μm and more preferably 10 nm to 30 μm. In addition, the content of the positive electrode active material in the positive electrode is not particularly limited, but is, for example, preferably 40% to 99% by mass %.

In addition, as described above, in the lithium battery according to the embodiment of the invention, the positive electrode and the negative electrode may optionally further include a well-known solid electrolyte which can be used in the lithium battery. Examples of the solid electrolyte which can be included in the positive electrode and the negative electrode include Li$_2$S—SiS$_2$, LiI—Li$_2$S—SiS$_2$, LiI—Li$_2$S—P$_2$S$_5$, LiI—Li$_2$O—Li$_2$S—P$_2$S$_5$, LiI—Li$_2$S—P$_2$O$_5$, LiI—Li$_3$PO$_4$—P$_2$S$_5$, Li$_2$S—P$_2$S$_5$, and Li$_3$PS$_4$. A method of producing the solid electrolyte capable of being used in the lithium battery according to the invention is not particularly limited, and a solid electrolyte produced using a well-known production method can be appropriately used. In addition, the solid electrolyte may be amorphous or crystalline.

In addition, in the positive electrode, a well-known binder which can be contained in the positive electrode of the lithium battery can be used. Examples of the binder include acrylonitrile-butadiene rubber (ABR), butadiene rubber (BR), polyvinylidene fluoride (PVdF), and styrene-butadiene rubber (SBR). Further, the positive electrode can contain an conductive additive which improves conductivity. Examples of the conductive additive which can be contained in the positive electrode include carbon materials such as vapor-grown carbon fiber, acetylene black (AB), Ketjen black (KB), carbon nanotube (CNT), and carbon nanofiber (CNF); and metal materials which can endure an environment in which a lithium battery is used. For example, when the positive electrode is prepared using the slurry-like positive electrode composition which is prepared by dispersing the positive electrode active material, the solid electrolyte, the conductive additive, the binder, and the like in a liquid, as the usable liquid, for example, heptane can be used, and a non-polar solvent can be preferably used. In addition, the thickness of the positive electrode is, for example, preferably 0.1 μm to 1 mm and more preferably 1 μm to 100 μm. In addition, the positive electrode can be prepared through a pressing step. In the embodiment of the invention, a pressure at which the positive electrode is pressed can be set to be about 100 MPa.

In addition, the negative electrode active material contained in the negative electrode can have, for example, a particle shape or a thin film shape. An average particle size ($D_{50}$) of the negative electrode active material is, for example, preferably 1 nm to 100 μm and more preferably 10 nm to 30 μm. In addition, the content of the negative electrode active material in the negative electrode is not particularly limited, but is, for example, preferably 40% to 99% by mass %.

In addition, in the negative electrode, optionally, a binder which binds the negative electrode active material and the solid electrolyte to each other can be used, in addition to the negative electrode active material and the solid electrolyte. Examples of such a binder include the above-described binders which can be contained in the positive electrode.

Further, the negative electrode may contain a conductive additive which improves conductivity. Examples of the conductive additive which can be contained in the negative electrode include the above-described conductive additives which can be contained in the positive electrode. For example, when the negative electrode is prepared using the slurry-like negative electrode composition which is prepared by dispersing the negative electrode active material, the solid electrolyte, the conductive additive, the binder, and the like in a liquid, as the usable liquid, for example, heptane can be used, and a non-polar solvent can be preferably used. In addition, the thickness of the negative electrode is, for example, preferably 0.1 µm to 1 mm and more preferably 1 µm to 100 µm. In addition, the negative electrode can be prepared through a pressing step. In the embodiment of the invention, a pressure at which the negative electrode is pressed is preferably 200 MPa or higher and more preferably about 400 MPa.

In addition, as the solid electrolyte which is contained in the solid electrolyte layer, a well-known solid electrolyte which can be used in an all-solid-state battery can be appropriately used. Examples of such a solid electrolyte include the above-described solid electrolytes which can be contained in the positive electrode or the negative electrode. In addition, the solid electrolyte layer can contain a binder which binds the solid electrolytes to each other from the viewpoint of, for example, exhibiting plasticity. Examples of such a binder include the above-described binders which can be contained in the positive electrode. However, in order to realize high output, the content of the binder in the solid electrolyte layer is preferably 5 mass % or less from the viewpoints of, for example, preventing excessive aggregation of the solid electrolyte and forming a solid electrolyte layer in which a solid electrolyte is uniformly dispersed. In addition, when the solid electrolyte layer is formed through a step of coating a substrate with a slurry-like solid electrolyte composition which is prepared by dispersing the solid electrolyte and the like in a liquid, as the liquid in which the solid electrolyte and the like are dispersed, for example, heptane can be used, and a non-polar solvent can be preferably used. The content of a solid electrolyte material in the solid electrolyte layer is, for example, preferably 60% or more, more preferably 70% or more, and still more preferably 80% or more by mass %. In addition, the thickness of the solid electrolyte layer varies depending on the configuration of a battery, but is, for example, preferably 0.1 µm to 1 mm and more preferably 1 µm to 100 µm.

In addition, as the negative electrode current collector and the positive electrode current collector, a well-known metal which can be used as a current collector of a lithium battery can be used. Examples of such a metal include metal materials containing one or two or more elements selected from the group consisting of Cu, Ni, Al, V, Au, Pt, Mg, Fe, Ti, Co, Cr, Zn, Ge, and In.

In addition, although not illustrated, the lithium battery according to the embodiment of the invention can be used in a state of being accommodated in a well-known battery case which can be used for a lithium battery. Examples of such a battery case include a well-known laminated film case or a metal case.

[Preparation of Sample]

EXAMPLE 1

(1) Preparation of Active Material

A high-potential positive electrode active material particle $LiNi_{0.5}Mn_{1.5}O_4$ (manufactured by Nicha Corporation) was prepared to attach a coating layer containing lithium niobate to a surface thereof.

(2) Preparation of Alkoxide Solution

After lithium ethoxide powder (manufactured by Kojundo Chemical Laboratory Co., Ltd.) was dissolved in dehydrated ethanol (manufactured by Wako Pure Chemical Industries Ltd.), niobium pentaethoxide having a molar ratio (lithium: niobium) of 1:1 was added to this solution under stirring. As a result, an alkoxide solution containing lithium ions and niobium ions was prepared.

(3) Attachment 494 g of the alkoxide solution prepared in (2) was sprayed on 1 kg of the high-potential positive electrode active material particle prepared in (1) using a tumbling fluidized bed granulating-coating machine (MP-01, manufactured by Powrex Corp.), and at the same time, the alkoxide solution was dried. As a result, a powder including the high-potential positive electrode active material particle and a coating layer precursor, which was attached to a surface of the high-potential positive electrode active material particle, was obtained. The target thickness of the coating layer precursor was 10 nm.

(4) Firing

The powder obtained in (3) was heated in air at 120° C. for 5 hours. As a result, an active material powder (active material powder of Example 1) including the high-potential positive electrode active material particle ($LiNi_{0.5}Mn_{1.5}O_4$) and the coating layer containing $LiNbO_3$, which was attached to the surface of the high-potential positive electrode active material particle, was prepared.

(5) Preparation of All-Solid-State Battery

The obtained active material powder of Example 1, a sulfide-based solid electrolyte ($30LiI-4Li_2O-48.5Li_2S-17.5P_2S_5$), and a conductive additive (vapor-grown carbon fiber, manufactured by Showa Denko K.K.) were weighed such that a volume ratio (Active Material Powder:Sulfide-Based Solid Electrolyte:Conductive Additive) was 50:50:5, and were mixed with each other. As a result, a powdered positive electrode mixture was obtained. Meanwhile, a negative electrode active material (natural graphite, manufactured by Mitsubishi Chemical Corporation) and a sulfide-based solid electrolyte ($30LiI-4Li_2O-48.5Li_2S-17.5P_2S_5$) were weighed such that a volume ratio (Negative Electrode Active Material:Sulfide-Based Solid Electrolyte) was 50:50, and were mixed with each other. As a result, a powdered negative electrode mixture was obtained. Next, a positive electrode current collector (stainless steel) was put into a cylindrical container having an inner diameter of 11.28 mm, 19.4 mg of the positive electrode mixture was placed thereon, 65.0 mg of the sulfide-based solid electrolyte ($30LiI-4Li_2O-48.5Li_2S-17.5P_2S_5$) was placed thereon, 11.9 mg of the negative electrode mixture was placed thereon, and a negative electrode current collector (stainless steel) was placed thereon. As a result, a laminate in which the solid electrolyte layer was interposed between the positive electrode layer and the negative electrode layer was obtained. Next, this laminate was pressed at a pressure of 422 MPa. As a result, an all-solid-state battery (powder pressing type press cell) of Example 1 was prepared. In the all-solid-state battery of Example 1, the capacity of the negative electrode was 1.2 times the capacity of the positive electrode, and the restraint torque thereof was 6 Nm. In the prepared all-solid-state battery of Example 1, in order to prevent a reaction between the battery and water, the battery was put into a glass desiccator in an inert gas atmosphere along with a molecular sieve.

EXAMPLE 2

Under the same conditions as those of Example 1 except that the firing temperature during the preparation of the active material powder was changed to 200° C., an active material powder (active material powder of Example 2) including the high-potential positive electrode active material particle ($LiNi_{0.5}Mn_{1.5}O_4$) and the coating layer containing $LiNbO_3$, which was attached to the surface of the high-potential positive electrode active material particle, was prepared. Further, under the same conditions as those of Example 1 except that the active material powder of Example 2 was used instead of the active material powder of Example 1, an all-solid-state battery (all-solid-state battery of Example 2) was prepared.

COMPARATIVE EXAMPLE 1

Under the same conditions as those of Example 1 except that the firing was not performed during the preparation of the active material powder, an active material powder (active material powder of Comparative Example 1) including the high-potential positive electrode active material particle ($LiNi_{0.5}Mn_{1.5}O_4$) and the coating layer (coating layer precursor) containing $LiNbO_3$, which was attached to the surface of the high-potential positive electrode active material particle, was prepared. Further, under the same conditions as those of Example 1 except that the active material powder of Comparative Example 1 was used instead of the active material powder of Example 1, an all-solid-state battery (all-solid-state battery of Comparative Example 1) was prepared.

COMPARATIVE EXAMPLE 2

Under the same conditions as those of Example 1 except that the firing temperature during the preparation of the active material powder was changed to 350° C., an active material powder (active material powder of Comparative Example 2) including the high-potential positive electrode active material particle ($LiNi_{0.5}Mn_{1.5}O_4$) and the coating layer containing $LiNbO_3$, which was attached to the surface of the high-potential positive electrode active material particle, was prepared. Further, under the same conditions as those of Example 1 except that the active material powder of Comparative Example 2 was used instead of the active material powder of Example 1, an all-solid-state battery (all-solid-state battery of Comparative Example 2) was prepared.

COMPARATIVE EXAMPLE 3

Under the same conditions as those of Example 1 except that the firing temperature during the preparation of the active material powder was changed to 500° C., an active material powder (active material powder of Comparative Example 3) including the high-potential positive electrode active material particle ($LiNi_{0.5}Mn_{1.5}O_4$) and the coating layer containing $LiNbO_3$, which was attached to the surface of the high-potential positive electrode active material particle, was prepared. Further, under the same conditions as those of Example 1 except that the active material powder of Comparative Example 3 was used instead of the active material powder of Example 1, an all-solid-state battery (all-solid-state battery of Comparative Example 3) was prepared.

[Specification of BET Specific Surface Area]

The BET specific surface area of the above-described high-potential active material particle was measured using a specific surface area measuring device (TRISTAR 3000, manufactured by Shimadzu Corporation). After being rounded off to two decimal places, the BET specific surface area was 0.72 $m^2/g$.

[Measurement of Weight Loss Per Unit Volume]

Regarding the active material powders of Examples 1 and 2 and the active material powders of Comparative Examples 1 to 3 which were prepared using the above-described methods, the weight of the active material powder after being heated in air from 200° C. to 350° C. and the weight of the active material powder before being heated in air from 200° C. to 350° C. (the weight of the active material powder at 200° C.) were measured using TG-DTA (manufactured by Rigaku Corporation). Using these weights, a weight loss W ($g/mm^3$) of the active material powder per unit volume after being heated in air from 200° C. to 350° C. was examined. Using the obtained weight loss W, the BET specific surface area S, and the target thickness h, a weight loss ratio $X=W \times S \times h$ was calculated, and the values thereof are shown in Table 1.

[Evaluation of Charging-Discharging Cycle Characteristics]

Each of the all-solid-state batteries of Examples 1 and 2 and the all-solid-state batteries of Comparative Examples 1 to 3 which were prepared using the above-described methods was charged and discharged under the following conditions.

Charging: The all-solid-state battery was charged to a potential of 5.0 V based on lithium metal of the positive electrode at a current of 1 C. The charging time was one hour at a maximum.

Discharging: The all-solid-state battery was discharged to a potential of 3.6 V based on lithium metal of the positive electrode at a current of 1 C. The discharging time was one hour at a maximum.

The charging and discharging were performed in 20 cycles. Next, regarding each of the all-solid-state batteries of Examples 1 and 2 and the all-solid-state batteries of Comparative Examples 1 to 3, the resistance of the battery which was charged to 20% of the capacity was evaluated using an AC impedance measuring device (manufactured by Solartron). The results are shown in Table 1.

TABLE 1

| Sample | Firing Temperature (° C.) | Weight Loss Ratio (ppm) | Resistance (Ω) |
| --- | --- | --- | --- |
| Example 1 | 120 | 126.1 | 6877 |
| Example 2 | 200 | 166.3 | 4248 |
| Comparative Example 1 | None | 110.0 | 20930 |
| Comparative Example 2 | 350 | 114.2 | 7314 |
| Comparative Example 3 | 500 | 100.6 | 169740 |

Figure 5:
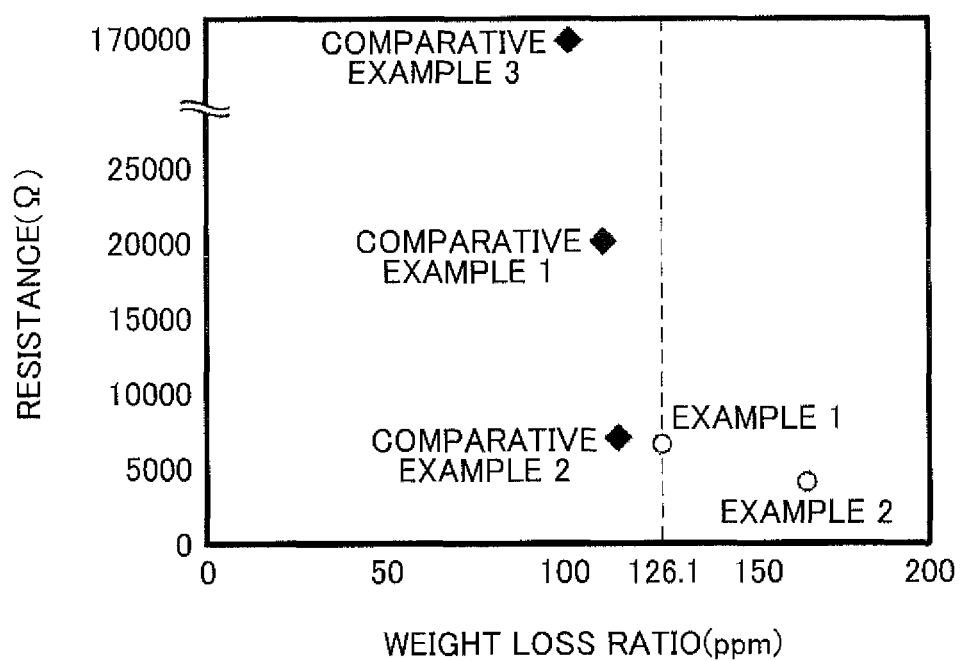
FIG. 5 is a diagram illustrating a relationship between a weight loss ratio and a resistance.
Figure 6:
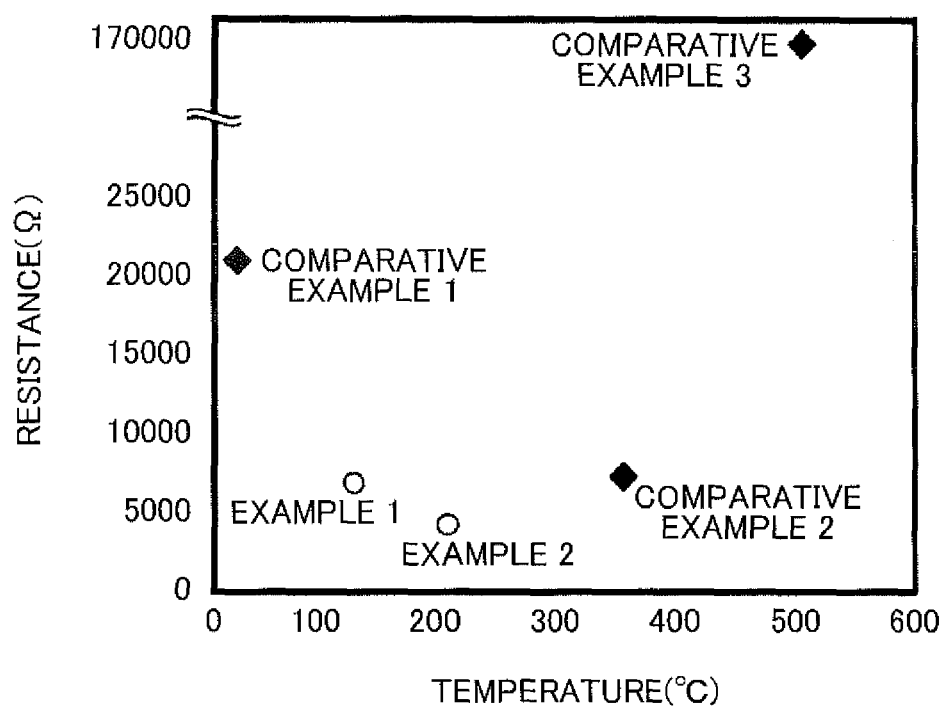
FIG. 6 is a diagram illustrating a relationship between a firing temperature and a resistance.

FIG. 5 illustrates a relationship between a weight loss ratio and a resistance shown in Table 1. In addition, FIG. 6 illustrates a relationship between a firing temperature and a resistance. Although the active material powder of Comparative Example 1 was not fired, the result of Comparative Example 1 was illustrated at room temperature in FIG. 6 for convenience of illustration. In addition, FIG. 7 illustrates the results of a weight loss ratio (%) of the active material powder of Comparative Example 1 which was separately obtained using TG-DTA (manufactured by Rigaku Corporation) after being heated to 600° C. in air.

As illustrated in Table 1 and FIGS. 5 and 6, in Examples 1 and 2 in which the weight loss ratio X was 126.1 ppm or higher, the battery resistances after the charging-discharging cycles were lower than those of Comparative Examples 1 to 3 in which the weight loss ratio X was lower than 126.1 ppm. In particular, in Example 2, the battery resistance after the charging-discharging cycles was lower. It was verified from this result that, according to the embodiment of the invention, an active material powder capable of improving charging-discharging cycle characteristics and a method of producing the same can be provided.

Figure 7:
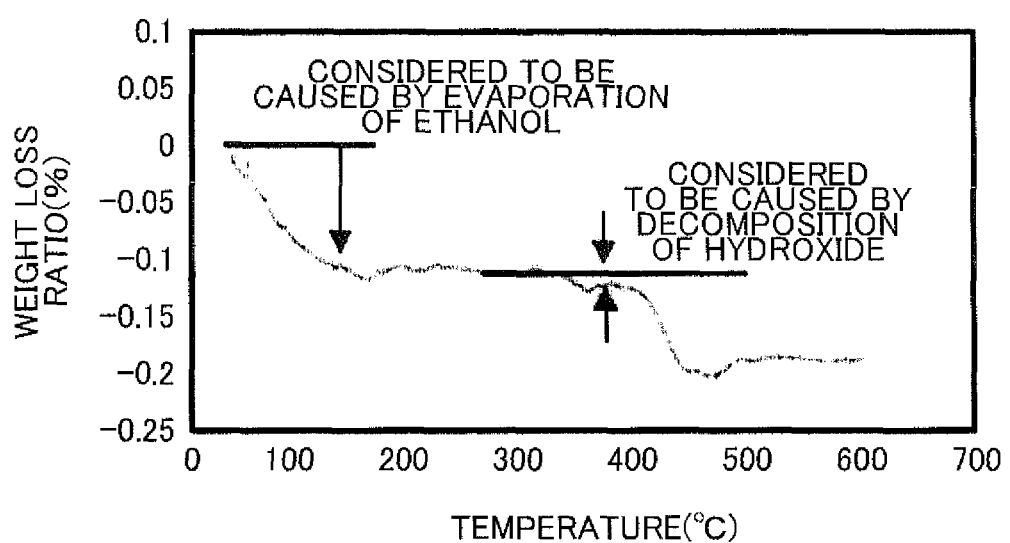
FIG. 7 is a diagram illustrating a relationship between a weight loss ratio of a non-fired active material powder and a temperature.

In addition, from the results of the weight loss of the non-fired active material powder illustrated in FIG. 7, it is considered that the weight loss observed during a period from the start of the heating to about 120° C. was caused by evaporation of ethanol contained in the alkoxide solution, and it is considered that the weight loss observed in a temperature range of about 350° C. or higher was caused by decomposition of a hydroxide. From this result, the reason why the weight loss ratios X of Comparative Examples 2 and 3 were lower than those of Examples 1 and 2 is considered to be that, since the firing temperature was 350° C. or higher in Comparative Examples 2 and 3, the amount of a hydroxide remaining in the coating layer before the heating was small. In addition, it is considered that, since the method of producing an active material powder according to the embodiment of the invention includes the heating step of heating the powder to be within a temperature range of 120° C. to 200° C., alcohol used in the attachment step does not remain in the coating layer. From this result, it is considered that, in the heating step of heating the powder to be within a temperature range of 120° C. to 200° C., the decomposition of a hydroxide can be suppressed, and a hydroxide remains in the coating layer of the active material powder which is produced using the method of producing an active material powder according to the embodiment of the invention.

What is claimed is:

1. A method of producing an active material powder, the method comprising:
    attaching an alkoxide solution containing lithium ions and niobium ions to a surface of an active material particle and drying the attached alkoxide solution to obtain a powder; and
    heating the powder within a temperature range of 120° C. to 200° C. to form a coating layer on the surface of the active material particle,
    wherein the active material particle contains Mn and stores and releases lithium ions at a potential of 4.5 V or higher based on Li.

2. The method according to claim 1, wherein
    the alkoxide solution attached to the surface of the active material particle is dried while the alkoxide solution is attached to the surface of the active material particle.

3. The method according to claim 1, wherein the active material particle contains $LiNi_{0.5}Mn_{1.5}O_4$ or $LiNi_{1/3}Co_{1/3}Mn_{1/3}O_2$.

4. The method according to claim 1, wherein the active material particle contains $LiNi_{0.5}Mn_{1.5}O_4$.

* * * * *